US012687817B2

(12) United States Patent
Tanner et al.

(10) Patent No.: US 12,687,817 B2
(45) Date of Patent: Jul. 21, 2026

(54) CALENDAR MECHANISM WITH SEASON DISPLAY FOR A TIMEPIECE

(71) Applicant: PATEK PHILIPPE SA GENEVE, Geneva (CH)

(72) Inventors: Samuel Tanner, Plan-les-Ouates (CH); Julien Feyer, Plan-les-Ouates (CH)

(73) Assignee: PATEK PHILIPPE SA GENEVE, Geneva (CH)

( * ) Notice: Subject to any disclaimer, the term of this patent is extended or adjusted under 35 U.S.C. 154(b) by 307 days.

(21) Appl. No.: 18/566,896

(22) PCT Filed: Jun. 15, 2022

(86) PCT No.: PCT/IB2022/055525
§ 371 (c)(1),
(2) Date: Dec. 4, 2023

(87) PCT Pub. No.: WO2022/264046
PCT Pub. Date: Dec. 22, 2022

(65) Prior Publication Data
US 2024/0264566 A1 Aug. 8, 2024

(30) Foreign Application Priority Data
Jun. 16, 2021 (EP) .................................... 21179694

(51) Int. Cl.
*G04B 19/26* (2006.01)
*G04B 19/253* (2006.01)

(52) U.S. Cl.
CPC ........... *G04B 19/26* (2013.01); *G04B 19/253* (2013.01)

(58) Field of Classification Search
CPC ....... G04B 19/26; G04B 19/253; G04B 19/25
See application file for complete search history.

(56) References Cited

U.S. PATENT DOCUMENTS

| | | | | |
|---|---|---|---|---|
| 563,268 A | | 7/1896 | Fazel | |
| 4,206,592 A | * | 6/1980 | Maue | G04B 45/00 368/233 |
| 5,379,271 A | * | 1/1995 | Moedt | G09B 27/08 368/24 |
| 10,613,482 B2 | * | 4/2020 | Feyer | G04B 19/25353 |

(Continued)

FOREIGN PATENT DOCUMENTS

| | | |
|---|---|---|
| CH | 685585 B5 | 2/1996 |
| CH | 708648 A2 | 4/2015 |

(Continued)

OTHER PUBLICATIONS

International Search Report for PCT/IB2022/055525, mailed Sep. 16, 2022, 5 pages.

(Continued)

*Primary Examiner* — Sean Kayes
(74) *Attorney, Agent, or Firm* — NIXON & VANDERHYE

(57) ABSTRACT

The calendar mechanism with display of the seasons for a timepiece includes a drive wheel, the angular position of which is representative of the date, a season display member and a season display drive member arranged to be driven by the drive wheel and to drive the season display member only during a predetermined time interval, of less than thirty days, every three months.

18 Claims, 8 Drawing Sheets

(56) References Cited

U.S. PATENT DOCUMENTS

| | | | | |
|---|---|---|---|---|
| 2007/0213955 | A1* | 9/2007 | Ishida | G04G 9/00 702/178 |
| 2018/0120771 | A1* | 5/2018 | Feyer | G04B 19/24306 |

FOREIGN PATENT DOCUMENTS

| | | | |
|---|---|---|---|
| DE | 102008031441 | A1 | 1/2010 |
| EP | 3327516 | A1 | 5/2018 |
| JP | 2010121943 | A | 6/2010 |
| WO | 2019193430 | A1 | 10/2019 |

OTHER PUBLICATIONS

Written Opinion of the ISA for PCT/IB2022/055525 mailed Sep. 16, 2022, 5 pages.

* cited by examiner

CALENDAR MECHANISM WITH SEASON DISPLAY FOR A TIMEPIECE

CROSS-REFERENCE TO RELATED APPLICATIONS

This application is the US national stage of PCT/IB2022/055525, filed Jun. 15, 2022 and designating the United States, which claims the priority of EP 21179694.1, filed Jun. 16, 2021. The entire contents of each foregoing application are incorporated herein by reference.

BACKGROUND OF THE INVENTION

Field of the Invention

The present invention relates to a calendar mechanism with display of the seasons for a timepiece.

Description of the Related Art

Calendar mechanisms with display of the seasons have been proposed in U.S. Pat. No. 563,268 and the patent applications DE 102008031441 and EP 3327516.

In U.S. Pat. No. 563,268, the names of the seasons and of the months are written on the dial of the watch and the information relating to the current month and to the current season is given by a month hand turning over the dial. The displaying of the season is thus dependent on the displaying of the months, which makes it impossible to indicate the changes of season on the exact dates.

In the patent application DE 102008031441, the dial of the watch comprises four symbols in the form of a sun for summer, a leaf for autumn, a snowflake for winter and a flower for spring respectively. Each symbol is an aperture produced in the dial or a transparent zone of the dial. A first rotating plate driven by the movement of the watch and located below the dial has coloured sectors making it possible to change the colour of the active season in order to indicate whether the season is in its beginning, middle or end. A second plate serves to render invisible the symbols corresponding to the three seasons which are not active. This patent application relates only to the principle of displaying the seasons. No mechanism for driving the plates is described.

Finally, in the patent application EP 3327516, a first wheel is arranged to make one turn in thirty-one days in order to display the date and a second wheel, coaxial to the first wheel, is provided to display the seasons. The first and second wheels are driven by the same wheel assembly but with different gear ratios so that the second wheel turns more quickly than the first wheel and becomes offset by one turn every twelve turns of the first wheel. The first wheel carries a hand for indicating the date. The second wheel comprises, on its upper surface, totally visible through a large aperture produced in the dial, symbols representing the seasons, the current season being indicated by the symbol or the parts of symbols visible through an opening in the hand which indicates the date. This mechanism has the advantage of being simple but it does not permit precise display of the current season nor a precise indication of the changes of season.

The present invention aims to propose a calendar mechanism for displaying the seasons, its displaying of the current season and of the changes of season being able to be precise.

For this purpose, a calendar mechanism is provided as claimed in claim 1, particular embodiments being defined in the dependent claims.

The present invention also relates to a timepiece such as a wristwatch, a pocket-watch or a miniature clock, comprising such a calendar mechanism.

BRIEF DESCRIPTION OF THE DRAWINGS

Other features and advantages of the present invention will become clear upon reading the following detailed description given with reference to the attached drawings in which.

DETAILED DESCRIPTION

Figure 1:
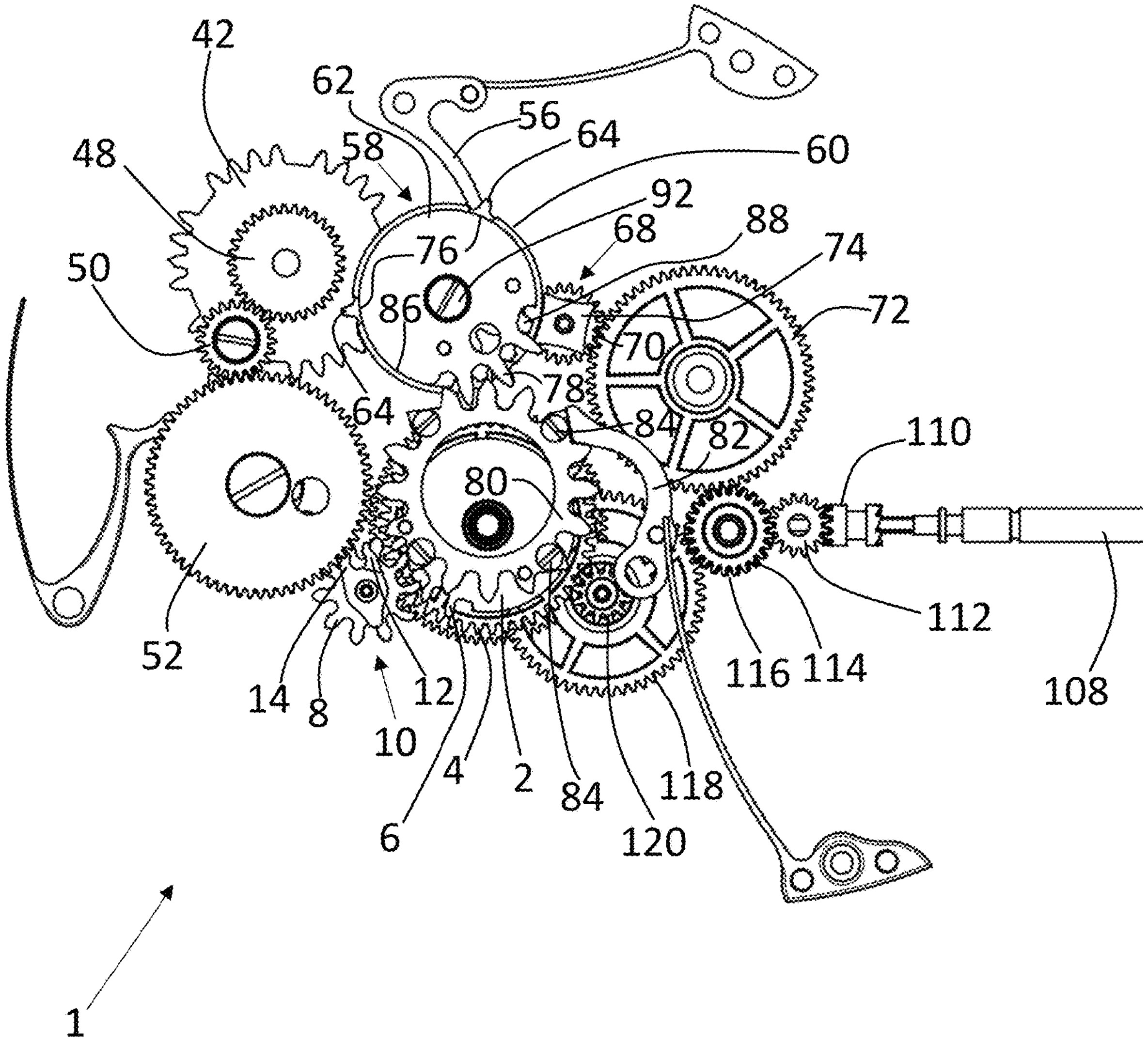
FIG. 1 is a top view of a calendar mechanism in accordance with one particular embodiment of the invention.
Figure 2:
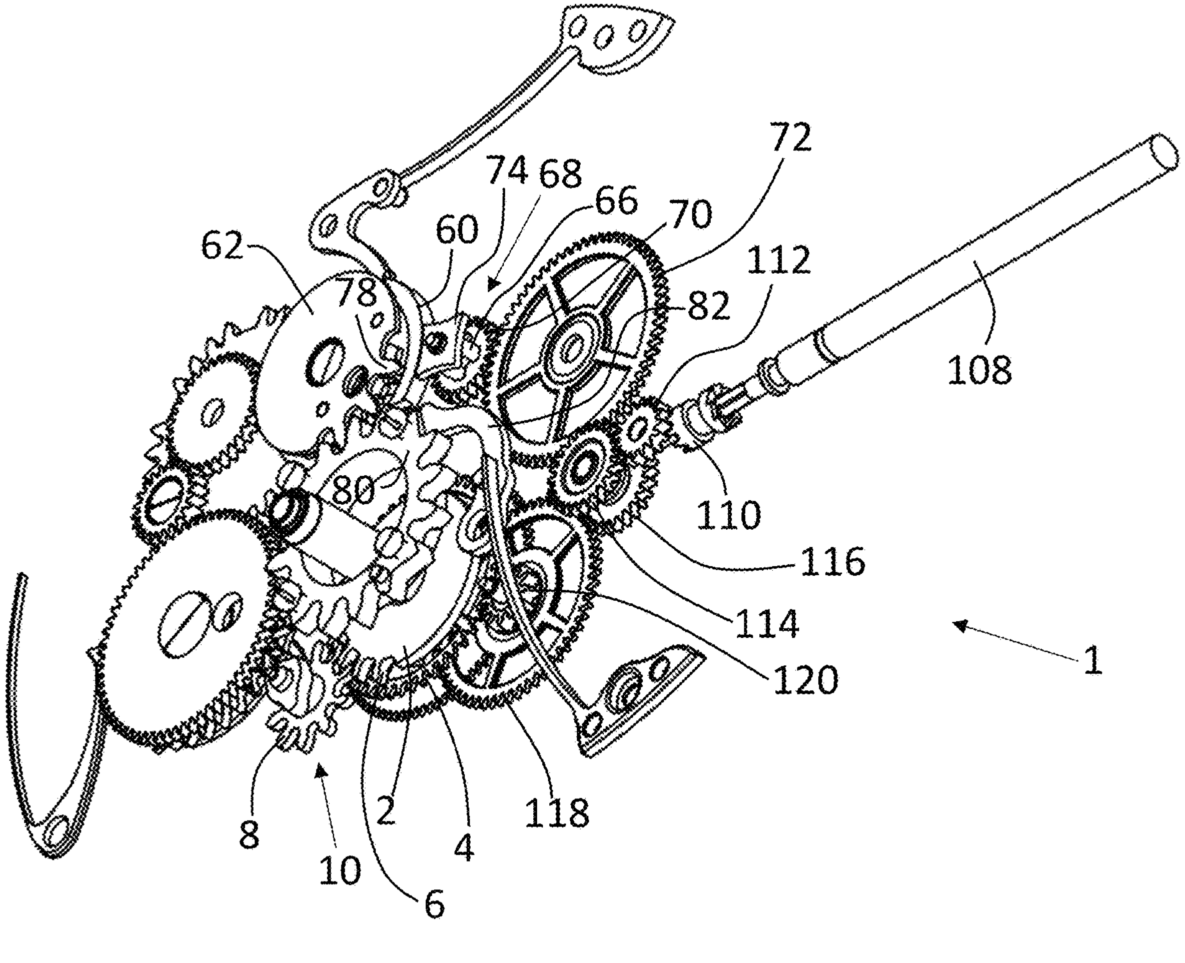
FIG. 2 is a perspective view of the calendar mechanism illustrated in FIG. 1.
Figure 3:
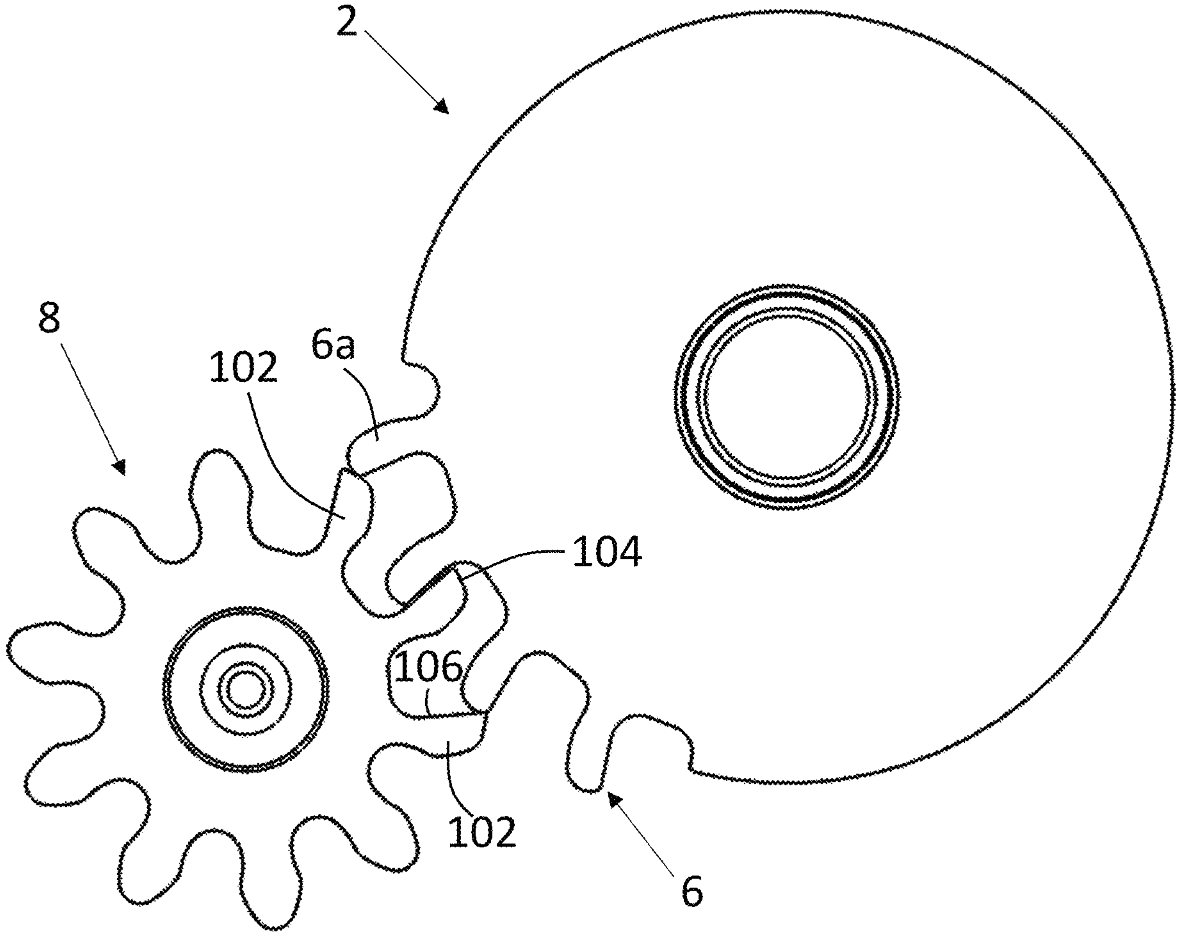
FIG. 3 shows a unidirectional gear formed by an hour cam and a pinion of a date drive wheel assembly of the calendar mechanism illustrated in FIG. 1.

With reference to FIGS. 1 to 3, a calendar mechanism 1 in accordance with the invention, integrated into a timepiece movement, comprises an hour cam 2 coaxial to, and fixedly attached to, the hour wheel 4 of the timepiece movement and thus turning at a rate of one turn per twelve hours. This hour cam 2 is a disc having, over a quarter of its perimeter, a toothed sector 6 with four teeth arranged to cooperate with the pinion 8 of a date drive wheel assembly 10. The pinion 8 is driven by the toothed sector 6 when this sector is located facing it, namely for a period of three hours per twelve-hour period, these three driving hours causing it to turn by 180°. When the pinion 8 is facing the non-toothed portion of the hour cam 2, during the remaining nine hours, it remains immobile. The pinion 8 thus makes one turn per twenty-four hours, but its movements during these twenty-four hours last only six hours in total. The hour cam 2 thus constitutes an acceleration cam making it possible to accelerate the rotation of the pinion 8. The hour cam 2 also has the function of preventing any backwards time-setting of the movement around midnight, as will be explained below with reference to FIG. 3.

Figure 4:
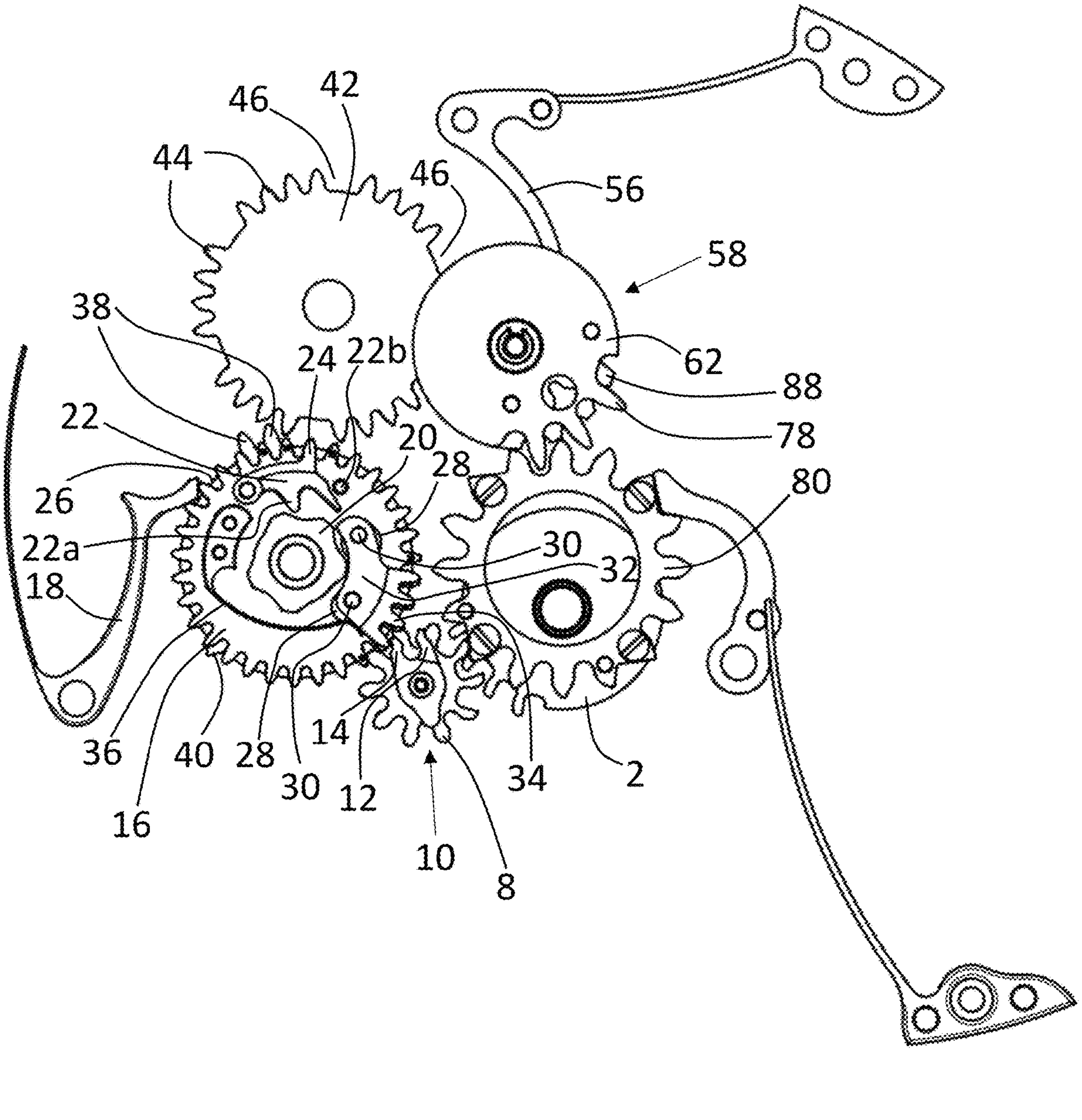
FIG. 4 is a top view of a part of the calendar mechanism illustrated in FIG. 1, in which certain elements have been removed in order to show what is located below.

Apart from the pinion 8, the date drive wheel assembly 10 comprises (cf. FIG. 4) a lower finger 12, or first finger, and an upper finger 14, or second finger, which are rigidly connected to the pinion 8 in positions which are offset both angularly and in height. With each turn of the date drive wheel assembly 10, around midnight, the lower finger 12 causes the advance by one pitch of a date wheel 16 which has thirty-one teeth and which is subject to the action of a date jumper 18. This date wheel 16, which thus makes one turn per month, is coaxial to a month cam 20 which is free to pivot with respect to the date wheel 16. The periphery of the month cam 20 comprises an alternating arrangement of troughs and raised portions, the troughs corresponding to the months with thirty-one days, the raised portions corresponding to the months with less than thirty-one days.

A month lever 22 is mounted in a pivoting manner on the plate of the date wheel 16 and comprises a beak 22*a* able to cooperate with the periphery of the month cam 20. The month lever 22 is free to rotate but its displacement is limited in one direction by the month cam 20 and in the other direction by a pin 22*b* driven into the plate of the date wheel 16. When the month lever 22 bears with its beak 22*a* against a raised portion of the month cam 20, a tooth 24 of the month lever 22 is superimposed on the toothing of the date wheel 16 and is thus located on the trajectory of the upper finger 14 when the date wheel 16 is in the angular position corresponding to day 30. When the beak 22*a* rests in a trough of the month cam 20, the tooth 24 is retracted with respect to the toothing of the date wheel 16 and cannot cooperate with the upper finger 14.

Thus, during the months with thirty-one days, the upper finger 14 cannot act upon the date wheel 16 and the passage from day 30 to day 31 is effected by the action of the lower finger 12, as for the other days. Even if the tooth 24 is located superimposed on the toothing of the date wheel 16, it actually moves back when it meets the upper finger 14, preventing the latter from driving the date wheel 16. In contrast, on the 30th of the months with thirty days, around midnight the upper finger 14 cooperates with the tooth 24 of the month lever 22, which is then bearing with its beak 22*a* on a raised portion of the month cam 20 in order to move the date wheel 16 by a first pitch for the passage from the 30th to the 31st, then the lower finger 12 cooperates with the toothing of the date wheel 16 in order to advance it by one additional pitch and to ensure the passage from the 31st to the 1st.

Each movement of the date wheel 16 is communicated, via a gear train (not shown), to a date indicator member (not shown) such as a crown, a disc or a hand.

The date drive wheel assembly 10, the date wheel 16 and the month lever 22 form part of an annual date mechanism based on the principle set forth in the patent CH 685585 and the patent application WO 2019/193430. Nevertheless, the date mechanism could be simple or perpetual.

A quarter year drive wheel 26 is mounted coaxially to the date wheel 16. The quarter year drive wheel 26 can turn with respect to the date wheel 16 only through a certain angle, defined by two openings 28 produced in the date wheel 16 and through which two respective pins 30 pass, which pins are driven on one side into the quarter year drive wheel 26 and on the other side into a season piece 32. The season piece 32 comprises a toothed sector 34 with four teeth superimposed on the toothing of the date wheel 16. A return spring 36 mounted on the plate of the date wheel 16 acts on the season piece 32 in order that at least one of the pins 30 is kept in a bearing position against the wall of the corresponding opening 28. This bearing position allows the date wheel 16 to drive the quarter year drive wheel 26.

The season piece 32 is positioned so that on day 19 of each month, around midnight, the upper finger 14 meets the first tooth of the season piece 32 and cooperates with it in order to move the quarter year drive wheel 26 with respect to the date wheel 16 by an angle corresponding to one pitch of the date wheel 16 against the action of the return spring 36. Then, still on the 19th around midnight, the lower finger 12 acts upon the toothing of the date wheel 16 in order to advance the date wheel 16 by one pitch and to catch up the quarter year drive wheel 26. On the 20th around midnight the upper finger 14 meets the second tooth of the season piece 32 and cooperates with it in order to move the quarter year drive wheel 26 with respect to the date wheel 16 by an angle corresponding to one pitch of the date wheel 16 against the action of the return spring 36. Then, the lower finger 12 acts upon the toothing of the date wheel 16 in order to advance the date wheel 16 by one pitch and to catch up the quarter year drive wheel 26. The same operation takes place on the 21st between the upper finger 14 and the third tooth of the season piece 32 and between the lower finger 12 and the toothing of the date wheel 16, then on the 22nd between the upper finger 14 and the fourth tooth of the season piece 32 and between the lower finger 12 and the toothing of the date wheel 16. On the other days, it is the date wheel 16 which drives the quarter year drive wheel 26 by at least one of the pins 30 bearing against the wall of the corresponding opening 28.

Thus, the quarter year drive wheel 26 is driven by one thirty-first of a turn each day, as the date wheel 16 is, but between the 19th and the 23rd this movement is effected in a time-offset manner with respect to the date wheel 16. This makes it possible to distribute the consumption of energy. As will be seen below, the movements of the quarter year drive wheel 26 between the 19th and the 23rd actually cause the movement of a season display every quarter year. In order to avoid large peaks in energy consumption it is advantageous that the jumps in date and the jumps in the displaying of the seasons take place at different times. In one variant, however, the season piece 32 could be omitted and the quarter year drive wheel 26 could be fixedly attached to the date wheel 16.

The quarter year drive wheel 26 comprises a season drive toothed sector formed by two large teeth 38. The quarter year drive wheel 26 further comprises a small tooth 40 for driving the months. The two large teeth 38 are dimensioned to cause a quarter year intermediate wheel 42 to advance by four pitches—the first from the 19th to the 20th, the second from the 20th to the 21st, the third from the 21st to the 22nd and the fourth from the 22nd to the 23rd. The small tooth 40 causes the quarter year intermediate wheel 42 to advance by one pitch at the end of each month. The quarter year intermediate wheel 42 comprises six toothed sectors 44 of four teeth each, separated by six empty spaces 46 each occupying the place of a tooth. These empty spaces 46 have the function of allowing the small tooth 40 to catch the correct tooth of the quarter year intermediate wheel 42 each time. They do not impede the driving of the quarter year intermediate wheel 42 by the two large teeth 38.

The quarter year intermediate wheel 42 effects one turn in six months. A month drive wheel 48 (cf. FIG. 1) is coaxial to, and fixedly attached to, the quarter year intermediate wheel 42 and, via an intermediate wheel 50, drives, by one turn per twelve months, a month wheel 52 which is coaxial to, and fixedly attached to, the month cam 20.

Figure 5:
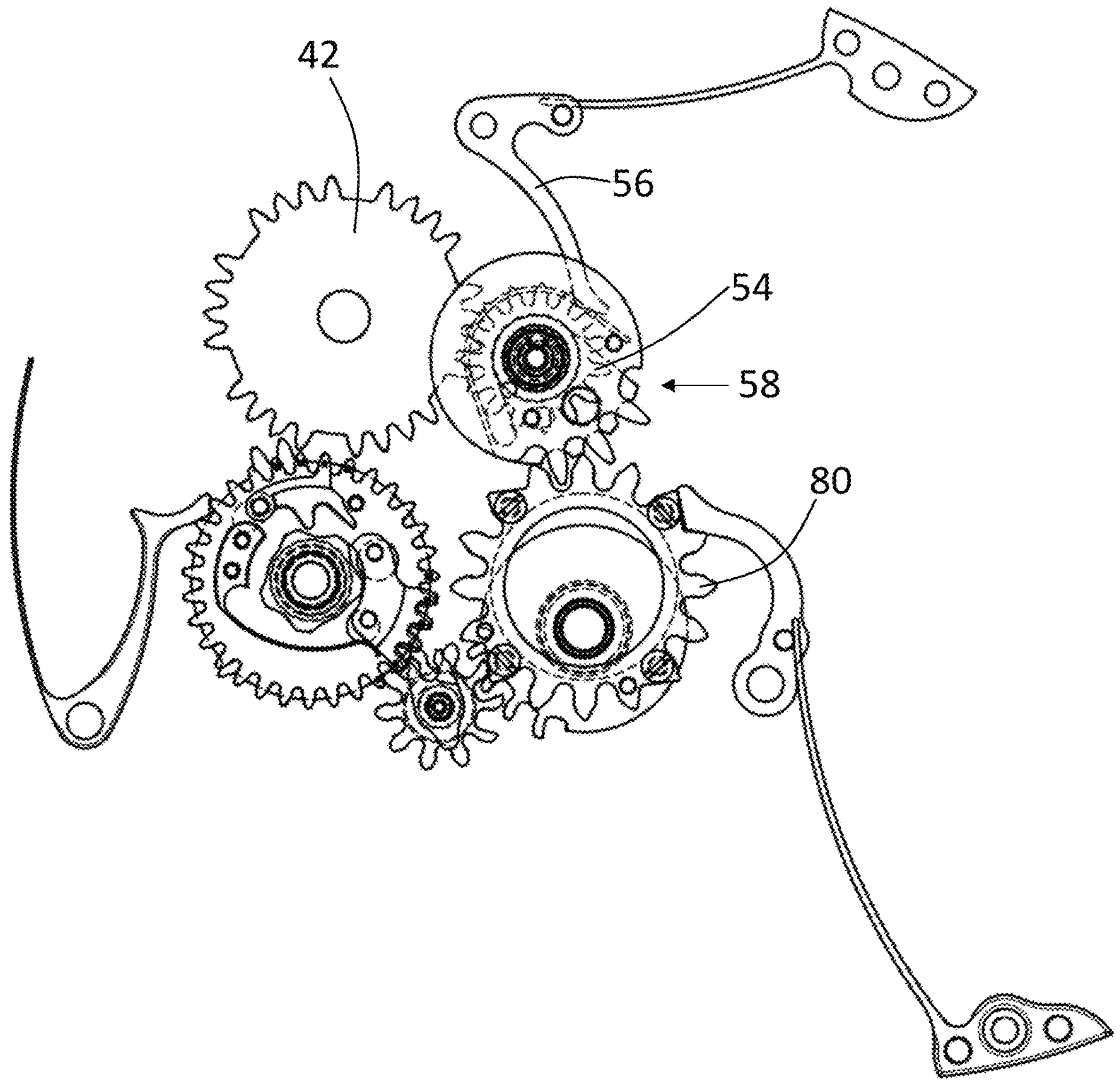
FIG. 5 is a view similar to FIG. 4 but showing the hidden parts by means of dotted lines.

The quarter year intermediate wheel 42 meshes with a fifteen-tooth pinion 54 which is subject to the action of a quarter year jumper 56 and forms part of a quarter year wheel assembly 58 (cf. FIG. 5). The quarter year wheel assembly 58 comprises a month display drive wheel 60 and a season display drive wheel 62, both fixedly attached to the pinion 54 (cf. FIG. 1). The quarter year wheel assembly 58 moves by one turn per quarter year but, as for the quarter year intermediate wheel 42, its movement is irregular: one jump each day around midnight between the 19th and the 23rd and one jump at the end of each month around midnight, that is to say five jumps per month and fifteen jumps per quarter year.

The month display drive wheel 60 is provided with three teeth 64 located at 120° from each other (only two of which can be seen in FIG. 1). On the last day of each month, one of these teeth 64 advances by one pitch the pinion 66 of a month display intermediate wheel assembly 68 (cf. FIG. 2), the wheel 70 of which is fixedly attached to the pinion 66 and meshes with a month display wheel 72 carrying a month indicator member, such as a hand or a disc, displaying the current month in conjunction with a dial. A square 74 with concave faces fixedly attached to the pinion 66 and to the wheel 70 fits closely to a non-toothed upper part of the periphery of the month display drive wheel 60 in order, in the event of an impact, to prevent untimely rotation of the month display wheel 72 and of the month indicator member under the effect of their inertia, or even driving of the quarter year wheel assembly 58 by the month display wheel 72. Three notches 76 produced in said non-toothed upper part in vertical alignment with the teeth 64 respectively allow the square 74 and thus the month display intermediate wheel assembly 68 to turn when one of the teeth 64 cooperates with the pinion 66 in order to drive it.

The season display drive wheel 62 comprises a toothed sector 78 with three teeth, the rest of the season display drive wheel 62 being non-toothed. The toothed sector 78 meshes every three months, between day 19 and day 23, with a season display star wheel 80 with sixteen teeth in order to move it by four teeth. The season display star wheel 80 is subject to the action of a season jumper 82 and carries a season indicator member, such as a disc carrying symbols of the seasons which can be seen in succession through an aperture in the dial or a hand. In the illustrated example, troughs between the teeth of the season display star wheel 80 which are not used to mesh with the season display drive wheel 62 are partially filled with material in order to receive screws 84 fixing a season indicator disc to the season display star wheel 80.

When the season display star wheel 80 faces the non-toothed sector of the season display drive wheel 62, designated by 86, its toothing abuts immediately against this non-toothed sector 86 in the event of an impact, which prevents it from turning in an untimely manner. In contrast, during the days when it is in engagement with the toothed sector 78, the season display star wheel 80 could, under the effect of an impact and its inertia, assume a driving effect and drive the quarter year wheel assembly 58. In order to avoid this, a safety member 88 complements the quarter year wheel assembly 58.

Figure 6:
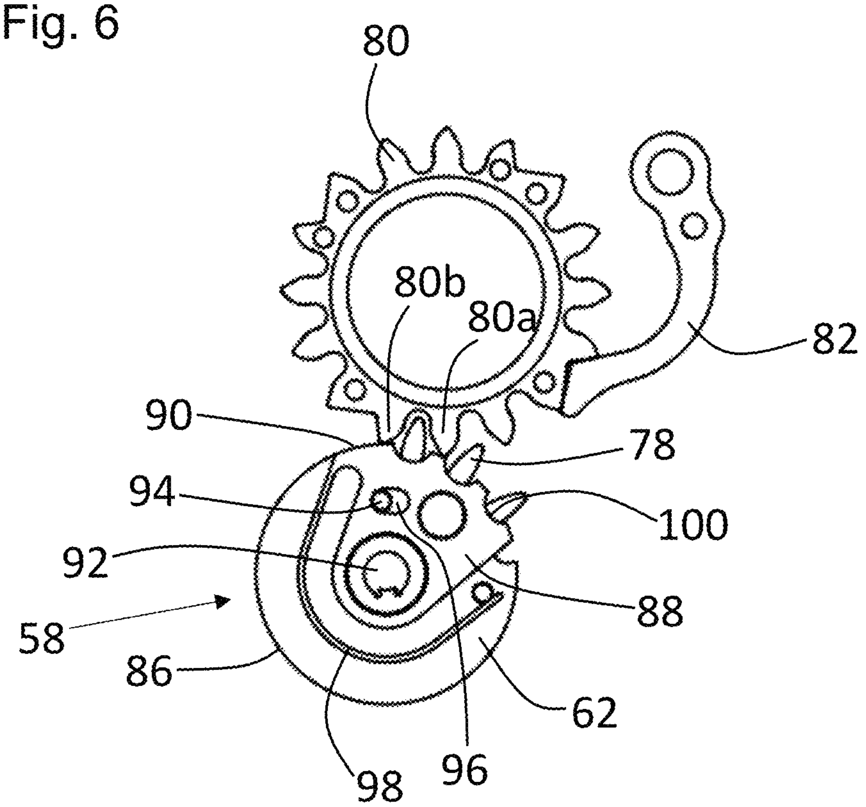
FIG. 6 is a bottom view of a part of the calendar mechanism illustrated in FIG. 1, showing a season display drive wheel, a safety member and a season display star wheel in an inoperative state.

The safety member 88 comprises (cf. FIG. 6) a safety surface 90 substantially concentric with the non-toothed sector 86 and with the shaft 92 of the quarter year wheel assembly 58 and which extends, at a different height, the periphery of the non-toothed sector 86 in the zone of the toothed sector 78. The safety member 88 is mounted to rotate freely about the shaft 92 of the quarter year wheel assembly 58 but its rotation with respect to the season display drive wheel 62 is limited by the cooperation between a pin 94 implanted in the season display drive wheel 62 and an oblong hole 96 produced in the safety member 88. A return spring 98 acting between the season display drive wheel 62 and the safety member 88 keeps the safety member 88 bearing against the pin 94 in an angular position with respect to the season display drive wheel 62 where three notches 100 provided in the safety surface 90 are respectively aligned with the three teeth of the toothed sector 78.

The toothing of the season display star wheel 80 has a sufficient height to be able to cooperate with both the season display drive wheel 62 and the safety member 88. When the toothed sector 78 and the season display star wheel 80 are in engagement and immobile, as in the configuration illustrated in FIG. 6, one tooth 80*a* of the season display star wheel 80 is facing a portion of the safety surface 90 and one tooth 80*b* of the season display star wheel 80 adjacent to the tooth 80*a* is facing another portion of the safety surface 90 or of the non-toothed sector 86 of the season display drive wheel 62 depending on the relative angular position of the wheel 62 and of the star wheel 80. Thus, when an impact is received by the calendar mechanism 1 tending to cause the season display star wheel 80 to turn, one of these two teeth 80*a*, 80*b*, depending on the orientation of the impact, abuts immediately against the safety surface 90 or the non-toothed sector 86. In this way, the season display star wheel 80 is prevented from turning in an untimely manner and driving the quarter year wheel assembly 58.

Figure 7:
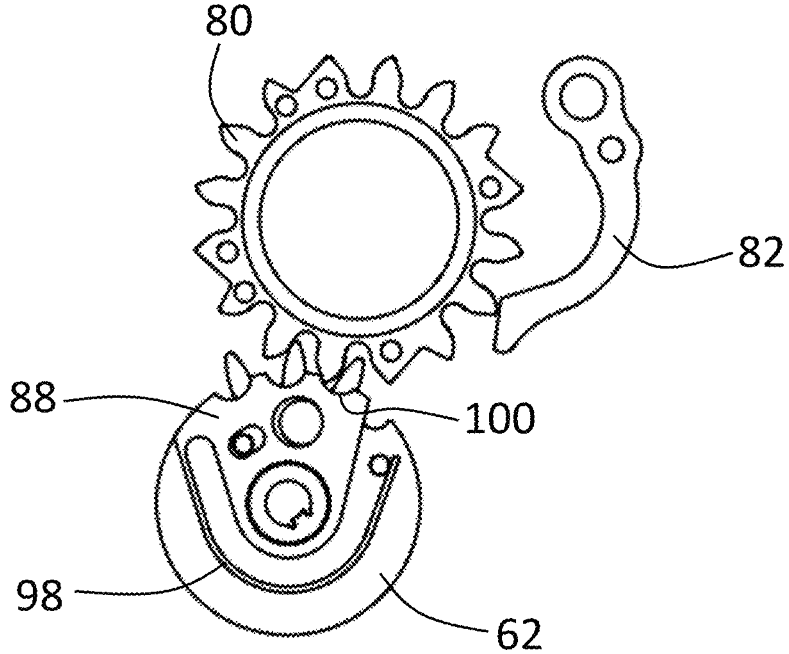
FIG. 7 is a bottom view of the part illustrated in FIG. 6, showing the season display drive wheel, the safety member and the season display star wheel during the driving of the season display star wheel.

The rotational mobility of the safety member 88 with respect to the season display drive wheel 62 makes it possible for the safety member 88 not to impede the driving of the season display star wheel 80 by the season display drive wheel 62. Indeed, each jump of the season display star wheel 80 comprises a first jump part in which the star wheel 80 is driven by the toothed sector 78 against the action of the season jumper 82 and a second jump part caused by the season jumper 82 after the latter has passed the tip of a tooth of the star wheel 80. During the first jump part, the safety member 88 is fixed relative to the season display drive wheel 62 owing to the pin 94 bearing against the wall of the oblong hole 96. During the second jump part, the safety member 88 uses its mobility with respect to the season display drive wheel 62, against the action of the return spring 98, to allow a tooth of the season display star wheel 80 located in one of the notches 100 (cf. FIG. 7) to pass, said tooth then continuing its movement until terminating the jump of the season display drive wheel 62.

It will have been understood that the different moving members of the calendar mechanism 1 are indexed with respect to each other so that the actuation of the quarter year drive wheel 26 by the upper finger 14, between the 19th and the 23rd of each month, does not cause actuation of the season display star wheel 80 by the quarter year wheel assembly 58 during two consecutive months (the toothed sector 78 not facing the season display star wheel 80) and causes actuation of the season display star wheel 80 by the quarter year wheel assembly 58 in the third month between day 19 and day 23. The season display star wheel 80 and the season indicator member which it carries thus turn by a quarter turn every three months, between the 19th and the 23rd, and are immobile the rest of the time.

It goes without saying that it would be possible to modify the calendar mechanism 1 so that the season display star wheel 80 moves by a quarter turn in four jumps between the 18th and the 22nd, in two jumps between the 20th and the 22nd, in a single jump between the 20th and the 21st or in a single jump between the 21st or the 22nd, for example, rather than in four jumps between the 19th and the 23rd.

All the dates mentioned above are based on the European dates for the change of season. The European dates for the change of season differ from one season to another and from one year to another but they are always between the 19th and the 23rd of the last month of each calendar quarter, i.e. between the 19th and the 23rd of the months of March, June, September and December, this applying at least up to the year 2100.

However, the present invention is applicable to other dates for the change of season than the European dates, e.g. to Russian or Eastern dates, in particular to dates for the change of season at the start of a month or in the middle of a month. Generally speaking, in the present invention, the season display star wheel 80 is driven only during a predetermined time interval, of less than thirty days, every three months and this time interval is preferably of at most ten days, preferably of at most seven days, preferably of at most five days.

In the case of the European dates, the predetermined time interval is a part of the last month of each calendar quarter and, preferably, this time interval ends before the last day of said last month. This time interval preferably includes, at least partially, the twenty-first day of the last month of each calendar quarter. This time interval preferably begins at the earliest on the 18th and ends at the latest on the 23rd.

In every case, it is advantageous to move the season display star wheel 80 in several jumps distributed over several days, preferably over at least three days, more preferably over at least four days, for two reasons: this ensures that the time interval during which the season display star wheel 80 moves covers the precise date for the change of season and this smooths the torque required for the driving of the season display star wheel 80—which must move by a quarter turn in order to indicate the change of season—and thus avoids a peak in energy consumption.

It will also have been understood that the various moving members of the calendar mechanism 1 are indexed with respect to each other so that the actuation of the quarter year drive wheel 26 by the lower finger 12 produces an effect on the month display wheel 72 only at the transition from the last day of each month to the first day of the following month.

Thus, the present invention makes it possible to change the information displayed on the current season at the exact dates for the change of season or on previously selected dates, in particular on dates which are distinct from those of the ends of the months. Furthermore, by virtue of the safety members 74 and 88, the displaying of the season is permanently synchronised with the displaying of the month so that desynchronisation between the season and the month during a correction of one or the other or during ongoing operation cannot take place.

In the calendar mechanism 1 as described above, the season display star wheel 80 cannot move backwards without the risk of breakage owing to the presence of the safety member 88. Other parts of the calendar mechanism 1 could be affected by this problem, e.g. the month display if it were of the retrograde type. In order to protect the calendar mechanism 1, the present invention prevents the correction of the time in the backwards direction around midnight. In order to do this, as illustrated in FIG. 3, teeth 102 of the pinion 8 of the date drive wheel assembly 10 which correspond to a time range including midnight have a flat tip 104 orientated tangentially with respect to the axis of the pinion 8 and are truncated on the side of their front flank 106. Once the hour cam 2 starts to turn in the anticlockwise direction, driven by a backwards rotation of a winding stem 108, a tooth 6*a* of the hour cam 2 abuts against the tip 104 of one of the teeth 102 and blocks the gear by butting. The teeth 102 and the toothed sector 6 thus form a unidirectional gear.

The rotation of the winding stem 108, when this stem is located in an axial time-setting position, is transmitted to the hour wheel 4 successively via (cf. FIGS. 1 and 2) a sliding pinion 110, a first intermediate wheel 112, a second intermediate wheel 114, a third intermediate wheel 116, a motion-work wheel 118 and a motion-work pinion 120. The second and third intermediate wheels 114, 116 are coaxial and fixedly attached. However, one of them is frictionally mounted on the common shaft of the intermediate wheels 114, 116 in order to be able to disconnect the winding stem 108 from the motion work in the event of excessive torque being exerted backwards by the user on the winding stem 108 while the hour cam 2 is blocked against the pinion 8 of the date drive wheel assembly 10.

In one exemplified embodiment, the displaying of the months and seasons can be corrected using a corrector acting on a ratchet coaxial to, and fixedly attached to, the quarter year intermediate wheel 42. In another exemplified embodiment, the displaying of the months and seasons can be corrected by the winding stem 108 of the timepiece movement having a dedicated axial position in which a rotation of the winding stem 108 causes the date wheel 16 to turn independently of the hour wheel 4. In this other exemplified embodiment, it may be useful to prevent any desynchronisation between the quarter year intermediate wheel 42 and the date wheel 16. To this end, a safety system, illustrated in FIGS. 8 to 11, can be used.

This safety system comprises, on the periphery of the quarter year drive wheel 26, a first safety surface 122 and a second safety surface 124. The first safety surface 122 extends angularly in the non-toothed sector of the quarter year drive wheel 26 which precedes the two large teeth 38 for driving the seasons, over the whole height of the quarter year drive wheel 26. Furthermore, the first safety surface 122 is concentric with the axis of the wheel 26 and has a radius R1. The second safety surface 124 extends angularly in the non-toothed sector of the quarter year drive wheel 26 which follows the two large teeth 38, jutting slightly beyond this non-toothed sector, but in height it extends only over a lower part of the quarter year drive wheel 26. Furthermore, the second safety surface 124 is concentric with the axis of the wheel 26 and has a radius R2 greater than the radius R1 and equal to the radius of the tip circle of the two large teeth 38. An upper part 126 of the non-toothed sector of the quarter year drive wheel 26 which follows the two large teeth 38 is concentric with the axis of the wheel 26 and has a radius R3 smaller than the radius R1. This upper part 126 extends from the season drive toothed sector formed by the two large teeth 38 to the small tooth 40 for driving the months which in this case is no longer in the form of a tooth but of a transition surface between the first safety surface 122 and said upper part 126.

Figure 8:
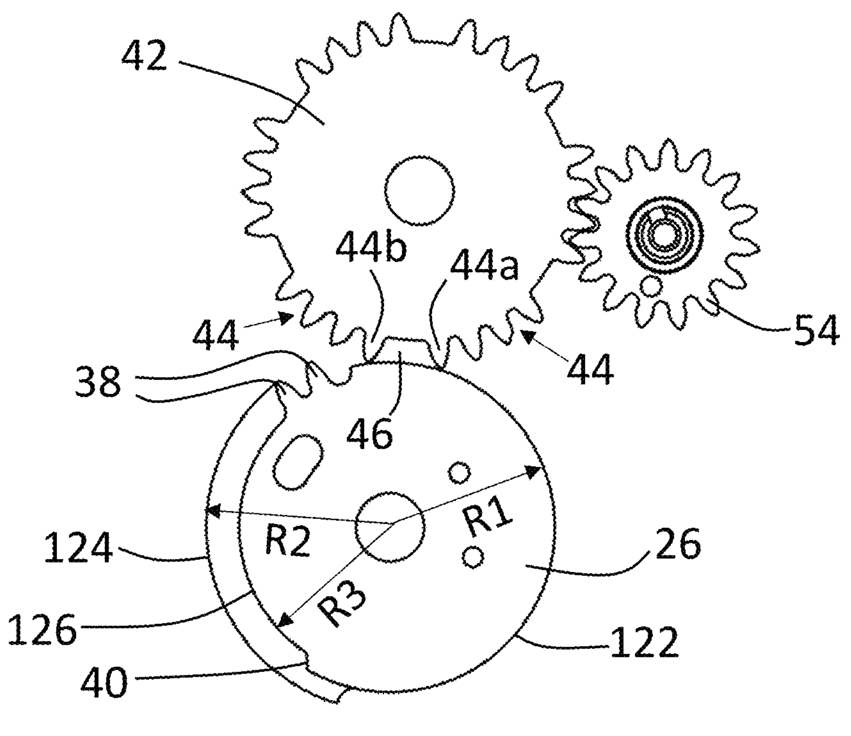
FIGS. 8 and 9 are respectively a top view and a perspective view of a part of a calendar mechanism according to another embodiment of the invention, showing a quarter year drive wheel and a quarter year intermediate wheel before the passage of a season.

As can be seen in FIG. 8, the first safety surface 122 serves as abutment respectively for the last tooth 44*a* and for the first tooth 44*b* of two adjacent toothed sectors 44 of the quarter year intermediate wheel 42 separated by an empty space 46, thus preventing, in the event of an impact, the wheel 42 from de-indexing with respect to the quarter year drive wheel 26 in one direction or in the other before passage of the seasons. For its part, the second safety surface 124 serves as abutment respectively for the second tooth 44*c* and for the first tooth 44*d* of two adjacent toothed sectors 44 of the quarter year intermediate wheel 42 (cf. FIG. 10), thus preventing, in the event of an impact, the wheel 42 from de-indexing with respect to the quarter year drive wheel 26 in one direction or in the other before passage of the months.

Figure 9:
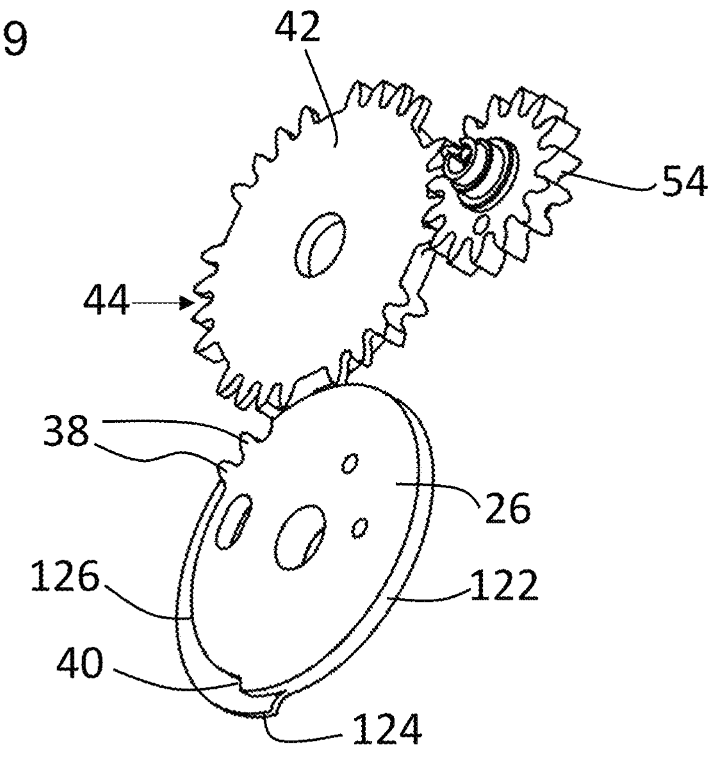
Figure 10:
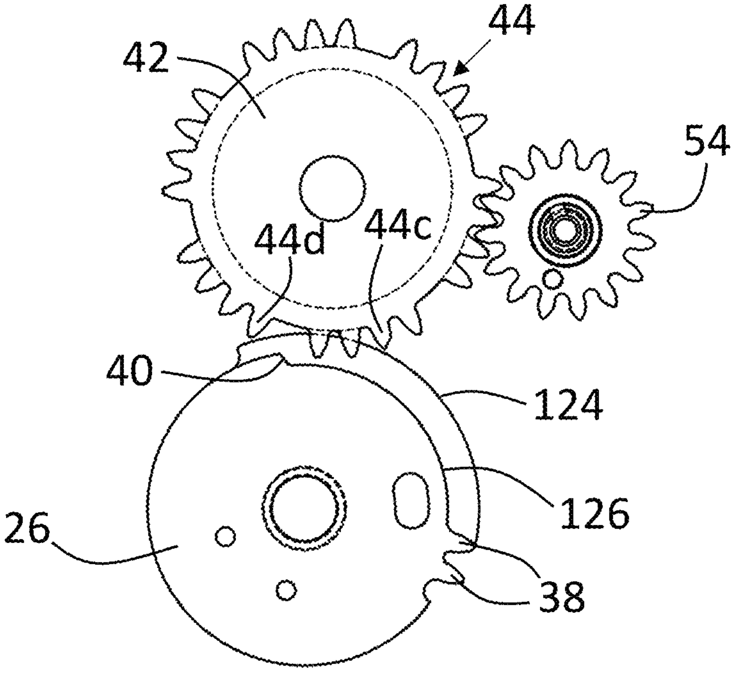
FIGS. 10 and 11 are respectively a top view and a perspective view of the part illustrated in FIGS. 8 and 9, showing the quarter year drive wheel and the quarter year intermediate wheel before the passage of a month.
Figure 11:
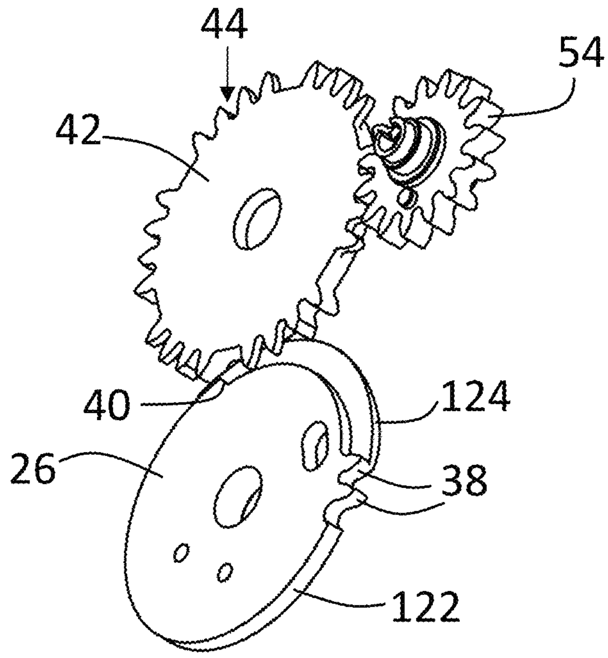

In order to permit this cooperation between the toothing of the quarter year intermediate wheel 42 and the safety surfaces 122, 124 as well as between the toothing of the quarter year intermediate wheel 42 and that of the quarter year drive wheel 26, the last two teeth of each toothed sector 44 have a height less than that of the first two teeth and are located on a different level to that of the second safety surface 124, i.e. the level of the upper part 126 and of the transition surface 40, as shown in FIGS. 9 and 11.

The present invention has been described above by way of example only. It goes without saying that modifications could be made without departing from the scope of the claimed invention.

The invention claimed is:

1. Calendar mechanism with display of the seasons for a timepiece, comprising:

a drive wheel, the angular position of which is representative of the date, a season display member, and a season display drive member arranged to be driven by the drive wheel and to drive the season display member only during a predetermined time interval, of less than thirty days, every three months, wherein the season display drive member is arranged in order, during the predetermined time interval, to move the season display member by several pitches distributed over several days.

2. The calendar mechanism as claimed in claim 1, wherein the predetermined time interval is of at most ten days.

3. The calendar mechanism as claimed in claim 1, wherein the predetermined time interval is a part of the last month of each calendar quarter.

4. The calendar mechanism as claimed in claim 3, wherein the predetermined time interval ends before the last day of said last month.

5. The calendar mechanism as claimed in claim 3, wherein the predetermined time interval includes, at least partially, the twenty-first day of the last month of each calendar quarter.

6. The calendar mechanism as claimed in claim 3, wherein the predetermined time interval begins at the earliest on the $18^{th}$, and ends at the latest on the $23^{rd}$.

7. The calendar mechanism as claimed in claim 1, wherein the season display drive member forms part of a wheel assembly arranged to be driven by the drive wheel and further comprising a month display drive member.

8. The calendar mechanism as claimed in claim 7, wherein said wheel assembly is a quarter year wheel assembly making one turn in three months, wherein the season display drive member is a wheel comprising a toothed sector and wherein the month display drive member is another wheel comprising three teeth located at 120° with respect to each other.

9. The calendar mechanism as claimed in claim 8, wherein the quarter year wheel assembly further comprises a safety member to prevent the season display member from driving the quarter year wheel assembly under the effect of its inertia in the event of an impact.

10. The calendar mechanism as claimed in claim 9, wherein the safety member comprises a safety surface substantially concentric with the shaft of the quarter year wheel assembly and against which the season display member can abut in the event of an impact when it is in engagement with the toothed sector, and wherein the safety member has limited rotational mobility with respect to the season display drive member as well as notches in its safety surface so as not to impede the normal driving of the season display member.

11. The calendar mechanism as claimed in claim 1, wherein the drive wheel is coaxial to a date wheel arranged to drive a date indicator member and to be driven by a date drive wheel assembly, and wherein the drive wheel is arranged to be driven by the date drive wheel assembly in a time-offset manner with respect to the driving of the date wheel during the predetermined time interval.

12. The calendar mechanism as claimed in claim 11, wherein the drive wheel is arranged to be driven by the date wheel every day except during the predetermined time interval in which it is driven directly by the date drive wheel assembly in a time-offset manner with respect to the driving of the date wheel.

13. The calendar mechanism as claimed in claim 12, wherein the date drive wheel assembly comprises first and second fingers at different heights, the first finger being arranged to cooperate every day with the date wheel, the second finger being arranged to cooperate with at least one tooth fixedly attached to the drive wheel during the predetermined time interval.

14. The calendar mechanism as claimed in claim 13, wherein the second finger is also arranged to cooperate with a tooth of a lever carried by the date wheel and arranged to cooperate with a month cam coaxial to the date wheel during passage from the last day of a month of thirty days to the first day of the following month.

15. The calendar mechanism as claimed in claim 1, further comprising, between an hour wheel and the drive wheel, a gear, at least a part of which is unidirectional so as to prevent backwards time-setting around midnight.

16. Timepiece comprising a calendar mechanism as claimed in claim 1.

17. Calendar mechanism with display of the seasons for a timepiece, comprising:

a drive wheel, the angular position of which is representative of the date, a season display member, and a season display drive member arranged to be driven by the drive wheel and to drive the season display member only during a predetermined time interval, of less than thirty days, every three months, wherein the season display drive member forms part of a wheel assembly arranged to be driven by the drive wheel and further comprising a month display drive member, and wherein said wheel assembly is a quarter year wheel assembly making one turn in three months, wherein the season display drive member is a wheel comprising a toothed sector and wherein the month display drive member is another wheel comprising three teeth located at 120° with respect to each other.

18. Calendar mechanism with display of the seasons for a timepiece, comprising:

a drive wheel, the angular position of which is representative of the date, a season display member, and a season display drive member arranged to be driven by the drive wheel and to drive the season display member only during a predetermined time interval, of less than thirty days, every three months, wherein the drive wheel is coaxial to a date wheel arranged to drive a date indicator member and to be driven by a date drive wheel assembly, and wherein the drive wheel is arranged to be driven by the date drive wheel assembly in a time-offset manner with respect to the driving of the date wheel during the predetermined time interval.

* * * * *